United States Patent [19]

Chang et al.

[11] Patent Number: 5,536,613
[45] Date of Patent: Jul. 16, 1996

[54] PROCESSES FOR PREPARING TONER

[75] Inventors: Hui Chang, Tokyo, Japan; Joo T. Chung, Mt. View, Calif.; Joseph L. Leonardo, Penfield, N.Y.; Enno E. Agur, Toronto, Canada; John J. Ianni, Medina, N.Y.; Allison G. Thomas, Rochester, N.Y.; Linda A. Flannery, Webster, N.Y.

[73] Assignee: Xerox Corporation, Stamford, Conn.

[21] Appl. No.: 393,606

[22] Filed: Feb. 23, 1995

[51] Int. Cl.⁶ .................... G03G 9/087; D01F 1/02
[52] U.S. Cl. .................. 430/137; 430/109; 264/211; 264/210.1; 264/210.2; 264/210.3; 264/210.6; 523/206; 523/319; 523/346; 523/500; 524/700
[58] Field of Search .................. 430/137, 109; 524/700; 523/206, 319, 346, 500; 264/211, 210.1, 210.2, 210.3, 210.6

[56] References Cited

U.S. PATENT DOCUMENTS

| | | | |
|---|---|---|---|
| 5,057,392 | 10/1991 | McCabe et al. | 430/109 |
| 5,227,460 | 7/1993 | Mahabadi et al. | 430/137 |
| 5,393,630 | 2/1995 | Bayley et al. | 430/137 |
| 5,401,602 | 3/1995 | Mahabadi et al. | 430/137 |
| 5,407,772 | 4/1995 | Bayley et al. | 430/137 |
| 5,414,052 | 5/1995 | Mahabadi et al. | 430/31 |

*Primary Examiner*—Richard L. Schilling
*Attorney, Agent, or Firm*—John L. Haack

[57] ABSTRACT

A process for the preparation of pigmented toner compositions comprising: a) forming at a first temperature, a first melt mixture comprised of a partially crosslinked thermoplastic resin, pigment, optionally a wax, and optional additives, wherein the partially crosslinked thermoplastic resin is comprised of a mixture of crosslinked resin macrogel particles, crosslinked resin microgel particles, and uncrosslinked resin; and b) melt mixing at a second temperature, the first melt mixture to form a second mixture, wherein the macrogel particles are partially converted into microgel particles, and wherein the second temperature is less than or equal to the first temperature.

27 Claims, 1 Drawing Sheet

PROCESSES FOR PREPARING TONER

CROSS REFERENCE TO COPENDING APPLICATIONS AND ISSUED PATENTS

Attention is directed to commonly owned and assigned copending applications: U.S. Pat. No. 5,376,494, entitled "Reactive Melt Mixing Process for Preparing Crosslinked Toner Resin"; U.S. Ser. No. 08/035,609 filed Mar. 23, 1993, entitled "Reactive Melt Mixing Process For Preparing Cross-Linked Toner Resins and Toners Therefrom"; U.S. Ser. No. 08/159,176 filed Nov. 30, 1993, entitled "Unsaturated Polyesters"; U.S. Ser. No. 08/131,250 filed Oct. 4, 1993, entitled "Melt Mixing Processes"; and U.S. Ser. No. 08/064,773, filed May 21, 1993, now U.S. Pat. No. 5,414,052, entitled "Processes for Preparing Toner".

Attention is directed to commonly owned and assigned U.S. Pat. No. 5,227,460, entitled "Cross-Linked Toner Resins"; U.S. Pat. No. 5,352,556, entitled "Toners Having Cross-Linked Toner Resins"; and U.S. Pat. No. 5,376,494, entitled "Reactive Melt Mixing Process for Preparing Cross-Linked Toner Resin ".

The disclosures of the above mentioned patents and copending applications are incorporated herein by reference in their entirety.

BACKGROUND OF THE INVENTION

The present invention is generally directed to processes for the preparation of toners, and more specifically to economical processes for modifying toner resin characteristics, and the preparation of toner compositions thereafter. More specifically, the present invention relates to melt mixing processes, batch or continuous, and preferably continuous processes, for example, extrusion for the preparation of toner compositions, and wherein the toner resin is comprised of certain gel or crosslinked fractions generated during resin or toner preparation, reference U.S. Pat. Nos. 5,376,494 and 5,227,460 the disclosures of which are totally incorporated herein by reference, and which applications illustrate, for example, melt mixing processes for preparing toner including a first step comprising a reactive melt mixing process to crosslink an unsaturated base resin and a second step comprising a melt mix process to prepare a toner from the crosslinked resin by incorporating toner additives. With the processes of these copending patent applications, a reactive melt mixing step followed by an additive dispersion step are selected to prepare a toner from a base resin.

In copending patent application U.S. Ser. No. 08/064,773, now U.S. Pat. No. 5,414,052, is disclosed, in embodiments, a one step process for the preparation of toner compositions which comprises adding to an extruder, a base resin, initiator, pigment, and optional charge enhancing additive; effecting crosslinking of the base resin in the extruder to provide a toner comprising a pigment, optional charge additive, and a crosslinked resin comprising linear portions and crosslinked portions; and wherein said crosslinked portions are comprised of densely crosslinked gel particles.

Problems associated with the aforementioned processes include the formation of large unpigmented gel particles, as determined by, for example, optical microscopy, during the reactive extrusion of a mixture comprised of a reactive or unsaturated resin and a free radical initiator compound, optionally a pigment, and other optional additives. The unpigmented gel particles residing in pigmented toner compositions are believed to be aggregates of microgel particles, hereinafter referred to as macrogel particles, and are believed to be responsible for producing a print image defect known as mottle or spots and or streaks that possess considerable color variation in a printed image. The aforementioned problem was particularly apparent at low toner mass per unit area (TMA) deposition regions. Another problem of the aforementioned processes concerned the inhibition of free radical reactive extrusion crosslinking processes in the presence of the pigment materials, for example, carbon black, which is a known free radical scavenger. The present invention, in embodiments, provides processes for preparing toner compositions comprising forming a melt mixture with a partially crosslinked toner resin, pigment, a wax, and optional additives in an extruder or equivalent melt mixing device which is suitable for conducting melting and mixing operations to form a predispersed toner mixture; and thereafter conducting at least one additional melt mixing operation on the resulting predispersed toner mixture under temperature or shear conditions that are different from the aforementioned melt mixing to provide a toner with a well defined gel content and an operator controllable melt index.

In other embodiments the present invention is directed to a process for the preparation of pigmented toner compositions comprising: forming at a first temperature, a first melt mixture comprised of a partially crosslinked thermoplastic resin, pigment, at least one wax, and optional additives, wherein the partially crosslinked thermoplastic resin is comprised of a mixture of crosslinked resin macrogel particles, crosslinked resin microgel particles, and uncrosslinked resin; and melt mixing at a second temperature, the first melt mixture to form a second mixture, wherein macrogel particles are partially converted into microgel particles, and wherein the second temperature is less than or equal to the first temperature. In other embodiments, the aforementioned resultant second mixture may be repeatedly melt mixed, for example from 1 to about 10 times, to further reduce the relative ratio of macrogel particles to microgel particles. Additional melt mixing steps of the first pigmented toner mixture provides opportunities for further reducing the particle size of the macrogel particles and which macrogel content and particle size reduction may be used to further enhance the electrophotographic developmental properties of the final toner composition, and the print or copy quality of the imaged toner. Thus, with the processes of the present invention, unpigmented macrogel particles are reduced or substantially eliminated from the resulting toner composition thereby providing toners that are subsequently capable of producing developed electrophotographic images with improved print quality, particularly with respect to color images and transparency uniformity by reducing or eliminating image ghosting or offset and large gel particles deletions.

The toner prepared in accordance with the processes of the present invention can be selected for heat fixable imaging and printing, such as xerographic methods, and wherein there results excellent fusing, vinyl offset performance, and enhanced print quality and uniformity.

Toner utilized in development in the electrographic process is generally known and is prepared by mixing and dispersing a colorant and a charge enhancing additive into a thermoplastic binder resin, followed by micropulverization. As the thermoplastic binder resin, several polymers are known and may be selected including polystyrenes, styrene-acrylic resins, styrene-methacrylic resins, styrene-butadiene resins, polyesters, epoxy resins, acrylics, urethanes and copolymers thereof. As the colorant, carbon black is utilized often, and as the charge enhancing additive, alkyl pyridinium halides, distearyl dimethyl ammonium methyl sulfate, and the like are known.

Toner can be fixed to a support medium such as a sheet of paper or transparency by different fixing methods. A fixing system which is very advantageous in heat transfer efficiency and is especially suited for high speed electrophotographic processes is hot roll fixing. In this method, the support medium carrying a toner image is transported between a heated fuser roll and a pressure roll with the image face contacting the fuser roll. Upon contact with the heated fuser roll, the toner melts and adheres to the support medium forming a fixed image.

Fixing performance of the toner can be characterized as a function of temperature. The lowest temperature at which the toner adheres to the support medium is referred to as the cold offset temperature (COT), and the maximum temperature at which the toner does not adhere to the fuser roll is known as the hot offset temperature (HOT). When the fuser temperature exceeds HOT, some of the molten toner adheres to the fuser roll during fixing and is transferred to subsequent substrates containing developed images, resulting for example in blurred images. This undesirable phenomenon is called offsetting. Between the COT and HOT of the toner is the minimum fix temperature (MFT) which is the minimum temperature at which acceptable adhesion of the toner to the support medium occurs, as determined by, for example, a creasing test. The difference between MFT and HOT is called the fusing latitude.

The hot roll fixing system described above and a number of known toners presently used therein exhibit several problems. First, the binder resins in the toners can require a relatively high temperature in order to be affixed to the support medium. This may result in high power consumption, low fixing speeds, and reduced life of the fuser roll and fuser roll bearings. Second, offsetting can be a problem; third, toner containing vinyl type binder resins such as styrene-acrylic resins may have an additional problem which is known as vinyl offset. Vinyl offset occurs when a sheet of paper or transparency with a fixed toner image comes in contact for a period of time with, for example, a polyvinyl chloride (PVC) surface containing a plasticizer used in making the vinyl material flexible such as, for example, in vinyl binder covers, and the fixed image adheres to the PVC surface.

Thus, there is a need for a toner prepared by simple economical processes which has a low fix temperature and a high offset temperature, or in the alternative, a wide fusing latitude, superior vinyl offset property and superior print quality characteristics. Toners which operate at lower temperatures can reduce the power needed for operation and increase the life of the fuser roll and the high temperature fuser roll bearings. Additionally, such low melt toners, that is, for example, toners having an MFT lower than 200° C., and preferably lower than 160° C., would reduce the volatilization of release oil such as silicone oil which may occur during high temperature heating operation and which can cause problems when the volatilized oil condenses in other areas of the machine. In particular, toners with a wide fusing latitude and with acceptable toner particle elasticity are needed. Toners with wide fusing latitude can provide flexibility in the amount of oil needed as release agent and can minimize copy quality deterioration related to toner offsetting to the fuser roll.

To lower the minimum fix temperature of the binder resin, in some instances the molecular weight of the resin may be lowered. Low molecular weight resins, such as amorphous polyester resins and epoxy resins, have been used for low fixing temperature toners. For example, the use of polyester resins as a toner binder is disclosed in U.S. Pat. No. 3,590,000 to Palermiti et al., and U.S. Pat. No. 3,681,106 to Burns et al. The minimum fixing temperature of polyester binder resins can be lower than that of other materials, such as styrene-acrylic and styrene-methacrylic resins. However, this may lead to a lowering of the hot offset temperature, and as a result decreased offset resistance. In addition, the glass transition temperature of the resin may be decreased, which may cause the undesirable phenomenon of blocking of the toner during storage.

To prevent toner from offsetting to the fuser roll and to increase fusing latitude of toners, various modifications of binder resin structure have been made, for example, by branching or crosslinking. In U.S. Pat. No. 3,681,106 to Burns et al., for example, a polyester resin was improved with respect to offset resistance by nonlinearly modifying the polymer backbone by mixing a trivalent or more polyol or polyacid with the monomer to generate branching during polycondensation. However, an increase in degree of branching may result in an elevation of the minimum fix temperature. Thus, any initial advantage of low temperature fix may be diminished.

Another method of improving offset resistance is to utilize crosslinked resin in the binder resin. For example, U.S. Pat. No. 3,941,898 to Sadamatsu et al., discloses a toner in which a crosslinked vinyl type polymer is used as the binder resin. Similar disclosures for vinyl type resins are made in U.S. Pat. Nos. Re. 31,072 (a reissue of 3,938,992) to Jadwin et al., 4,556,624 to Gruber et al., 4,604,338 to Gruber et al., and 4,824,750 to Mahalek et al.

While significant improvements can be obtained in offset resistance, a major drawback may ensue in that with crosslinked resins prepared by conventional polymerization, that is crosslinking during polymerization using a crosslinking agent, there exist three types of polymer configurations: an uncrosslinked linear and soluble portion referred to as the linear portion; a portion comprising highly crosslinked gel particles or high density crosslink gel particles which is not substantially soluble in organic solvents, like tetrahydrofuran, toluene and the like, and is called gel; and a second crosslinked portion which is low in crosslinking density and therefore is soluble in some solvents, such as, tetrahydrofuran, toluene, and the like, and is referred to as sol. The presence of highly crosslinked gel in the binder resin increases the hot offset temperature, but at the same time the low crosslink density portion or sol increases the minimum fix temperature. An increase in the amount of crosslinking in these types of resins results in an increase not only of the gel content, but also of the amount of sol or soluble crosslinked polymer with a low degree of crosslinking in the mixture. This results in an elevation of the minimum fix temperature, and as a consequence, in a reduction or reduced increase of the fusing latitude. Also, a disadvantage of crosslinked toner resin polymers prepared by conventional polymerization and concurrent crosslinking is that the compatibility of the crosslinked resin with other binder resins may be relatively poor and often exhibit vinyl offset.

Crosslinked polyester binder resins prepared by conventional polycondensation reactions have been provided for improving offset resistance such as, for example, in U.S. Pat. No. 3,681,106 to Burns et al. As with crosslinked vinyl resins, increased crosslinking as obtained in such conventional polycondensation reactions may cause the minimum fix temperature to increase. When crosslinking is accomplished during polycondensation using tri- or polyfunctional monomers as crosslinking agents with the polycondensation monomers, the net effect is that apart from obtaining highly crosslinked high molecular weight gel particles, which are not soluble in substantially any solvent, the molecular weight distribution of the soluble part widens due to the formation of sol or crosslinked polymer with a very low degree of crosslinking, and which sol is soluble in some solvents. These intermediate molecular weight gel species may result in an increase in the melt viscosity of the resin at low and high temperature, which can cause the minimum fix temperature to increase.

Crosslinked polyester binder resins prepared by a reactive melt mixing process have been disclosed in copending application U.S. Pat. No. 5,227,460, the disclosure of which is totally incorporated herein by reference. In this process, the crosslinking reaction is accomplished with a chemical free radical initiator compound when the unsaturated polyester polymer is in the molten state. The resultant partially crosslinked resin mixture comprises crosslinked portions and linear portions. The crosslinked portions comprise very high molecular weight densely crosslinked microgel particles having a volume average diameter of less than about 0.1 micron and are insoluble in substantially any solvent. The linear portion comprises lower molecular weight uncrosslinked resin which is soluble in various common organic solvents. Substantially no portion of the partially crosslinked resin mixture comprises sol or polymer with low degree of crosslinking. The crosslinked portions or microgel particles are prepared in such a manner that there is substantially no distance between the polymer chains, that is the crosslinked polymer chains are joined together by a single covalent bond and without intervening chemical structure. This crosslink structure is different from conventional crosslinking in which the crosslink distance between chains is quite large with several or more monomer units providing intervening chemical structure. The highly crosslinked microgel particles are distributed throughout the linear portion and impart elasticity to the resin, and which elasticity improves the resin offset properties, while not substantially affecting the resin minimum fix temperature. The aforementioned melt mixing process disclosed in U.S. Pat. No. 5,227,460 is a reactive melt mixing process whereby a base resin, for example an unsaturated polyester, is converted into a resin mixture comprised of an uncrosslinked linear fraction and a crosslinked fraction.

Many processes are known for effecting polymerization reactions, including reactive melt mixing processes, for both initial polymerization reactions employing monomers or prepolymers, and for polymer modification reactions, such as grafting, coupling, crosslinking, and degradation reactions. The process is generally known as a reactive extrusion process when the melt mixing device is an extruder. The reactive extrusion process is particularly advantageous for polymer modifications in many respects. The modification generally takes place when the polymer is in molten state, thus eliminating the use of large amounts of solvent whose handling is both difficult and costly. The extrusion process is inherently easier to control as compared to a large polymerization reactor vessel.

In the aforementioned U.S. Pat. Nos. 5,376,494 and 5,227,460 are disclosed processes whereby polymers are crosslinked using a chemical free radical initiator as a crosslinking promoting agent in the molten state at high temperature in an extruder. The partially crosslinked resin mixture prepared by the reactive extrusion process is subsequently melt blended again with a colorant, charge enhancing additives and the like, and result in a toner mixture prior to pulverizing operation to obtain toner particles. Although the first reactive extrusion operation can prepare a toner resin comprising very high molecular weight densely crosslinked microgel particles which improve the resin offset properties, the need to subject the resin to a second extrusion operation wherein intensive mixing and heating is employed to disperse toner additives and colorant can lead to the formation of macrogel particles which are frequently unpigmented. The unpigmented macrogel particles can produce the aforementioned print defects.

U.S. Pat. No. 5,057,392 to McCabe et al. discloses a low fusing temperature toner powder which employs a polyblend of a crystalline polyester and an amorphous polyester that has been crosslinked with an epoxy novolac resin in the presence of a crosslinking catalyst. The mixture, which includes the polyesters, the epoxy novolac resin, catalyst and colorant, is melt blended on heated compounding rolls or by passage through an extruder. During melt blending, the amorphous polymer is crosslinked with the epoxy novolac resin. Crosslinking substantially increases the offset latitude of the mixture. After melt blending, the mixture is annealed by being maintained at a temperature above the glass transition temperature of the amorphous polyester, but below the melting temperature of crystalline polyester, preferably in the range of 50° to 80° C. The annealing is continued for a time sufficient for the crystalline polyester to recrystallize as dispersed small particles within a matrix phase comprised of a crosslinked polymeric reaction product of the amorphous polyester and the epoxy novolac resin. Typical annealing times are in the range of about 0.2 to about 2 hours. If annealing is not carried out, the polyblend does not have the desired grindability and the toner powder derived therefrom does not have desired fusing temperature and shelf life or keep characteristic. The melt blending and reaction process is not sufficient to provide a toner with desired properties. An additional annealing step, following melt blending, to recrystallize the crystalline polyester is therefore necessary in order to provide the toner with optimum morphology. Another potential problem not addressed in the patent is the possibility of interference from some active toner additives during crosslinking. For instance, it is known that some carbon black pigments will inhibit certain types of polymer reactions.

Therefore, there remains a need for a toner composition and fabrication processes during which the toner properties can be optimized and controlled by redistribution of gel phase content from macrogel to microgel with, for example, high shear mixing, in a simple straightforward manner and thereafter provide toner particles which are substantially free of unpigmented macrogel particles.

SUMMARY OF THE INVENTION

It is an object of the present invention to provide simple and economical processes for the preparation of toners with many of the advantages illustrated herein.

It is another object of the present invention, in embodiments, to provide processes for the preparation of pigmented toner compositions comprising: forming at a first temperature, a first melt mixture comprised of a partially crosslinked thermoplastic resin, pigment, an optional wax, and optional additives, wherein the partially crosslinked thermoplastic resin is comprised of a mixture of crosslinked resin macrogel particles, crosslinked resin microgel particles, and uncrosslinked resin; and melt mixing at a second temperature, the first melt mixture to form a second mixture, wherein the macrogel particles are partially converted into microgel particles, and wherein the second temperature can be less than, equal to, or greater than the first temperature. The melt mixing at a second temperature can repeated N times to provide an N+1 product wherein N is an integer from 1 to about 10, and wherein the repeated melt mixing is conducted in a melt mixing apparatus, for example, an extruder or a rubber mill. The pigmented toner composition resulting from each melt mixing operation is comprised of a relatively constant amount of linear uncrosslinked base resin, substantially uniformly dispersed gel particles comprised of crosslinked macrogel and crosslinked microgel particles, pigment, and optional toner additives. During the aforementioned repeated melt mixing steps or operations at a second temperature and under high shear conditions, the macrogel particles are dissociated or reduced in size to microgel particles. The relative weight ratio of macrogel to microgel content is thereby progressively decreased and the relative level of pigment dispersion and other toner additive dispersion is progressively increased. The process can be carried out in either a batch or a continuous melt blending devices, although a continuous device such as a twin screw extruder is preferred.

In another object of the present invention is the provision of processes for the preparation of pigmented toner compositions comprising forming a melt mixture comprised of partially crosslinked toner resins, pigment, optionally a wax, and optional additives in an extruder to form a predispersed toner mixture; extruding the predispersed toner mixture wherein there results a first extrudate toner mixture comprised of crosslinked resin gel particles and uncrosslinked resin with a highly dispersed and uniform pigment dispersion therein; and thereafter reextruding the first extrudate toner mixture from 1 to about 10 times to provide, in embodiments, a toner composition with a high pigment dispersion, a low or nonexistent unpigmented macrogel particle component, and a crosslinked resin component wherein the microgel particle size is less than about 0.1 micron in average volume diameter.

Another object of the present invention relates to extrusion processes for the preparation of low melting toner compositions in a continuous operation, and wherein the toner is comprised of certain partially crosslinked resins as illustrated herein, such as a thermoplastic resin which can be sufficiently fixed at low temperatures, such as below 200° C. and preferably below 160° C., by hot roll fixing. Thus, less heat or other source of energy is needed for fixing than for higher fix temperature toner, and therefore, less power is consumed during operation of a copier or printer. The known undesirable paper curl phenomenon may also be reduced, or higher speed of copying and printing may be enabled. Also, the toners formulated possess excellent hot offset resistance, wide fusing latitude and acceptable rheological properties; are inexpensive, safe and economical; and show minimized or substantially no vinyl offset.

In another object of the present invention, there is provided a process whereby a partially crosslinked toner resin is formulated and modified into a pigmented toner composition and wherein little or no unpigmented macrogel particles remain in the toner.

These and other objects of the present invention are accomplished in embodiments by a continuous or batchwise multi-stage melt blending process comprising: forming at a first temperature, for example, of from about 65° to about 200° C., a first melt mixture comprised of a partially crosslinked toner resin mixture, pigment, optionally a wax or waxes and, for example, 1 to 10 waxes, preferably 1 to about 3 waxes, such as polypropylene or polyethylene preferably with a low weight average molecular weight of about 1,000 to about 10,000, and optional additives in, for example, an an extruder; melt mixing at a second temperature of from about 40° to about 200° C., the first melt mixture to form a second mixture, wherein macrogel particles contained in the partially crosslinked toner resin mixture are partially converted into microgel particles, and wherein the second temperature is less than or equal to the first temperature and thereafter repeating melt mixing of the resulting toner mixture at the second temperature from 1 to about 10 times to further reduce the macrogel content and macrogel particle size, and to increase the dispersion level of the pigment and other additives to desired levels.

Subjecting the toner composite matrix containing densely crosslinked resin or gel particles to one or more of the aforementioned repeat mixing steps or reforming or reextrusion steps, the macrogel content of the toner composition is further converted into either smaller sized or microgel particles by mechanical breakdown. The toner composite can then be processed into toner particles following known and conventional size reduction and classification steps. Accurate temperature control along the length of the extruder enables the macrogel breakdown processes to be carried out in a controlled and reproducible fashion. Extruder screw configuration can also be designed, for example, by including more kneading elements, for example, from about 4 to about 15 additional elements, to provide more mixing action to improve material distribution and to promote subsequent macrogel breakdown. Other toner additives may be added together with the partially crosslinked resin and pigment mixture, or fed separately to the extruder at a downstream location. Further, suitable screw configurations and temperatures at downstream portions of the extruder may be used to facilitate the dispersion of various additives. In embodiments, water can be optionally introduced into the extruder at a downstream location, by for example, injection, for the purpose of lowering the temperature of the toner composite melt. Water injection thus provides an increase in the viscosity of the melt mixture and thereby promotes the efficiency of the extruder shear forces acting on the melt mixture and enhances the rate of macrogel particle breakdown in the reextrusion or repeat melt mixing stages of the process.

The process steps of the present invention in embodiments comprise (1) adding partially crosslinked toner resin, pigment and optional toner additives to a melt mixing device to form a first mixture; (2) melting the mixture; (3) mixing the molten mixture at a temperature from 65° to 200° C. to disperse the additives and pigment; (4) optionally adding additional toner additives; (5) facilitating the dispersion of toner additives by providing mixing action at optimum levels of temperature and mixer speed; (6) optionally devolatilizing the melt to remove any effluent volatiles; and (7) discharging the molten mixture to a cooling device to provide solidified toner. Alternatively, the discharged molten mixture may be directly directed to a second melt mixing device or extruder to accomplished one or more of the aforementioned repeat mixing or reextrusion steps. The resulting solidified toner mixture can then be pulverized and classified to obtain particles of desirable size and distribution. The solidified toner can be directly reextruded as a solid mass or subsequent to pulverization and classification into particles. Thus, reextrusion of toner particles is particularly advantageous for recycling those particles whose size properties fall above or below particle size specifications considered suitable for toner applications but whose compositional properties render the material still highly viable for use in toner applications if the toner particle size properties and or the gel content are suitably adjusted by following the objects of the present invention. The present invention, in embodiments, provides a highly efficient and convenient means for reprocessing and recovery of so-called "out of spec" particle size toner materials which would heretofore be discarded as waste toner.

The pigmented toner composition that results from dispersive melt mixing or blending in the present process contains resin which is comprised of crosslinked or gel portions and linear portions. The crosslinked portions comprise very high molecular weight densely crosslinked microgel particles having average diameter less than about 0.1 micron and are insoluble in substantially any solvent, including tetrahydrofuran, toluene, and the like solvents, and macrogel particles having average diameter greater than about 0.1 micron. The linear portion comprises lower molecular weight resin molecules which are soluble in various solvents such as, for example, tetrahydrofuran, toluene and the like. The high molecular weight highly crosslinked gel particles are substantially uniformly distributed within the linear or uncrosslinked resin portions. Substantially none of first extrudate toner resin nor the reextruded toner resin comprises sol or low crosslinked density polymer and which sol component is typically obtained in conventional crosslinking processes such as polycondensation, bulk, solution, suspension, emulsion and dispersion polymerization processes.

DETAILED DESCRIPTION OF THE INVENTION

The present invention provides economical processes for the preparation of a low fix temperature toner containing a controlled level of microgel and macrogel content and uncrosslinked resin content by carrying out both toner additive dispersion and macrogel content reduction in any melt mixing device, batch or continuous, but preferably continuous wherein toner additives including colorants are uniformly dispersed within the resin matrix under high shear conditions. An additional melt mixing or multiple reextrusion process steps enables the efficient reformation or redistribution and control of the gel content and composition of the toner composition, from macrogel to microgel, thereby enabling a high level of control over the final toner composition and developability characteristics. In other embodiments of the present invention there are provided means for enabling the efficient recycling or reclamation of, for example, toner fines, which would otherwise find their way to a solid waste landfill as scrap.

The low fix temperature toners essentially free of unpigmented macrogel particles of the present are fabricated by a dispersive melt mixing processes comprising: (1) adding a partially crosslinked toner resin, pigment, and optional toner additives to a melt mixing device to form a mixture; (2) melting the toner mixture, thereby forming a toner melt, in the melt mixing device; (3) mixing the molten mixture at an elevated temperature to disperse the pigment and additives in the toner resin; (4) optionally adding additional toner additives; (5) facilitating the dispersion of toner additives by providing sufficient mixing action at optimum levels of temperature and mixer speed; (6) optionally devolatilizing the melt to remove any effluent volatiles; (7) discharging the molten mixture to a cooling device to provide solidified toner material; (8) melt mixing the cooled solidified toner material at a temperature preferably less than or equal to the the aforementioned elevated temperature and higher shear conditions compared to the first melt mixing dispersion step wherein the gel content of the resin mixture is redistributed from macrogel to microgel; and (9) repeating the aforementioned melt mixing step at a temperature less than or equal to the aforementioned elevated temperature and higher shear conditions from 1 to about 10 times for further redistribution or adjustment of the gel content in the resin mixture. In embodiments, the aforementioned first formed molten mixture is optionally directly discharged into a second melt mixing device which is operated at the aforementioned second temperature and high shear conditions for achieving the redistribution of the resin mixture gel content from macrogel to microgel.

In a preferred embodiment, the melt mixing or extrusion process comprises the aforementioned steps followed by reextrusion or reshearing of the resultant toner material as a melt, from 1 to about 10 times, at the lowest possible processing temperature which provides for melt mixing and gel reformation, to further breakdown macrogel particles to microgel particle sizes using continuous melt mixing devices such as an extruder or batch mixers such as a Banbury or rubber mill. The toner composition formed under the second temperature and higher shear conditions containing crosslinked materials can be reprocessed with reextrusion, for example, 1 to about 10 times, and preferably two to about six times, with the result that the macrogel content is reduced to desirable levels.

When initially formed melt mixtures of pigmented toner compositions with the highest macrogel particle content were subsequently melt mixed through Banbury/rubber mill type equipment, it was found that the resultant toner mixtures contained less macrogel than those toner mixtures obtained by extrusion type processing equipment.

Although not desired to be limited by theory it is believed that for a given number of repeated melt mixing or reextrusion steps, when conducted under a fixed set of conditions, such as shear, temperature, and the like, a minimized macrogel content will be achieved for which continued reextrusion or reprocessing will not provide any significant additional reduction in the total macrogel content or macrogel particle size. The minimum number steps must be determined empirically for a particular set of processing conditions and a given toner composition. For example, when a toner composition in embodiments of the present invention was prepared by melt mixing to form a toner composition containing a crosslinked resin component, further reprocessing with high shear melt mixing in excess of three repeat melt mixing or reextrusion passes or cycles failed to provide any additional or significant indication of further macrogel breakdown and did not provide improvements in print/copy quality of the toner imaged therefrom.

In the process of the present invention, the fabrication of low fix temperature toners may be accomplished in a melt mixing device such as an extruder described in U.S. Pat. No. 4,894,308 to Mahabadi et al., the disclosure of which is totally incorporated herein by reference. Generally, any intensive melt mixing device suitable for processing polymer melts may be employed provided that the objectives of the present invention are achieved. Examples of continuous melt mixing devices include single screw extruders or twin screw extruders, continuous internal mixers, disc extruders and roll mill extruders. Examples of batch internal melt mixing devices include Banbury, Brabender and Haake mixers.

One suitable type of extruder is the fully intermeshing co-rotating twin screw extruder such as, for example, the ZSK series of twin screw extruders available from Werner & Pfleiderer Corporation, Ramsey, N.J., U.S.A. For example, a small ZSK-40 twin screw extruder has a screw diameter of 40 millimeters and a length-to-diameter (L/D) ratio of 52.5. The extruder can melt the base resin, disperse optional toner additives and colorants into the uncrosslinked or partially crosslinked resins, optionally devolatilize the melt to remove any effluent volatiles if needed, and pump the melt through a die such as, for example, a strand die to a pelletizer.

Figure 1:
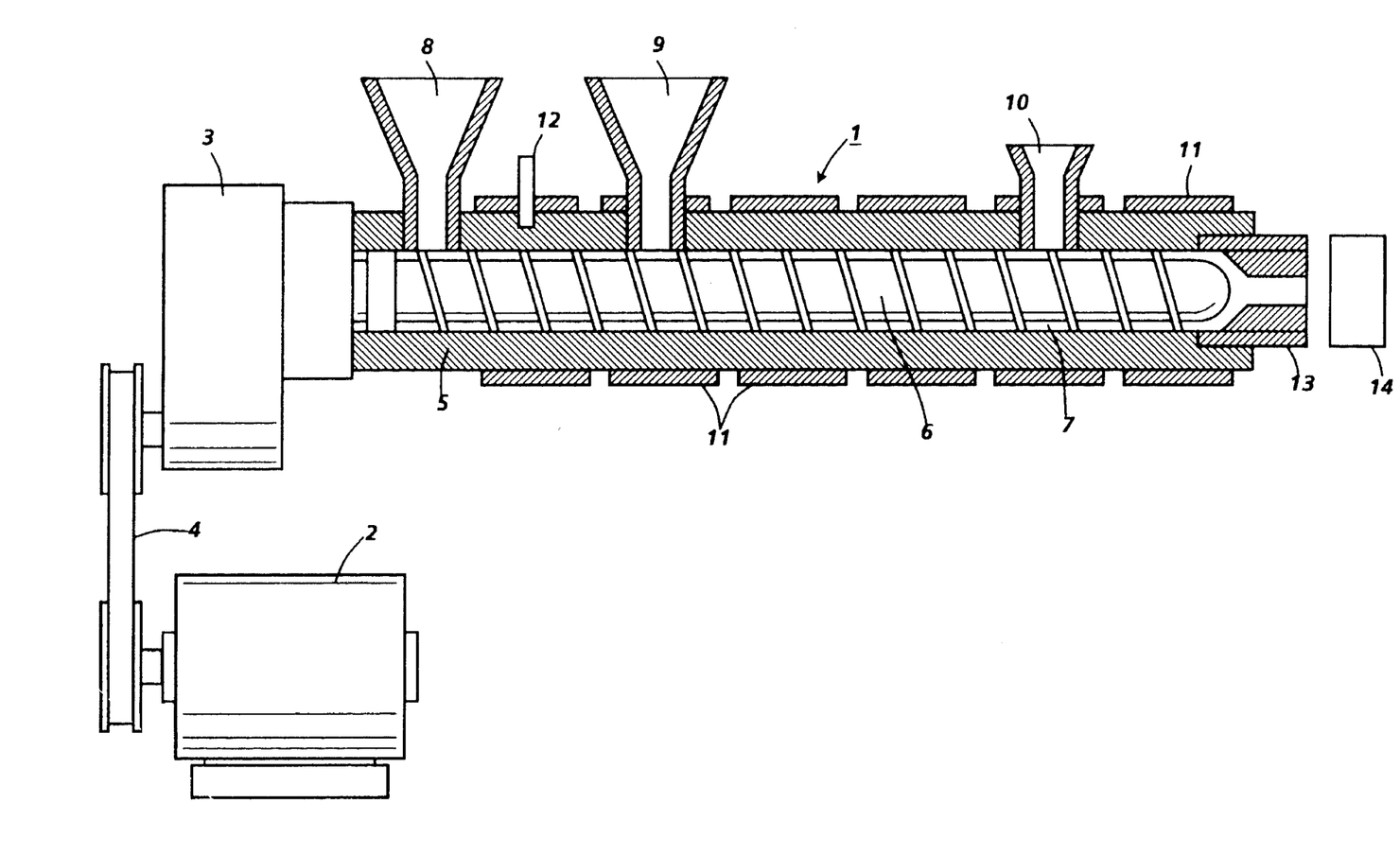
FIG. 1 is a partially schematic cross-sectional view of an extrusion process reactor suitable for the processes of the present invention.

A typical extrusion apparatus suitable for the process of the present invention is illustrated in FIGURE 1. In this FIGURE, there is shown a twin screw extrusion device 1 containing a drive motor 2, a gear reducer 3, a drive belt 4, an extruder barrel 5, a screw 6, a screw channel 7, an upstream supply port or hopper 8, a downstream supply port 9, a downstream devolatilizer 10, a heater 11, a thermocouple 12, a die or head pressure generator 13, and a pelletizer 14. The barrel 5 consists of modular barrel sections, each separately heated with heater 11 and temperature controlled through thermocouple 12 and temperature controller not shown in the figure. With modular barrel sections, it is possible to locate feed ports and devolatilizing ports at required locations, and to provide individual temperature control along the screw channel 7. The screw 6 is also modular in construction in the form of pieces of elements, enabling the screw to be configured with different conveying elements and kneading elements having the appropriate lengths, pitch angles, and the like, in such a way as to provide optimum conveying, mixing, dispersing, devolatilizing, discharging, and pumping conditions.

In embodiments of the present invention, a partially crosslinked thermoplastic resin for use as starting material may be prepared as follows: a reactive resin, or base resin, such as, for example, an unsaturated linear polyester resin, is crosslinked in the molten state with heating and high shear conditions in the absence of toner additives and colorants, preferably with a chemical initiator, such as, for example, organic peroxide, as a crosslinking agent in a melt blending device such as an extruder without forming any significant amounts of residual materials. Thus, the removal of byproducts or residual unreacted materials is not needed with embodiments of the present process. No monomers need be utilized in the present process, therefore, there is no need for removal of residual monomer.

In a preferred embodiment of the process of the present invention, the materials to be dispersed, that is the aforementioned partially crosslinked toner resin mixture, pigment, at least one wax additive and other optional toner additives, enter an extrusion apparatus from the first upstream supply port 8 and/or the second downstream supply port 9. The toner resin, usually in the form of solid powders, pellets, granules, or other forms, can be fed to the first upstream supply port 8 and second downstream supply port 9 by gravity feeding, volumetric feeding, weigh feeding, or other known feeding methods. Feeding of the pigment and optional additives to the extruder depends in part on physical state. In embodiments of the invention, especially if the pigment and additives are in solid or particulate form, the crosslinked resin, pigment and other toner additives are physically blended or premixed to form a preblend prior to being added to the extruder, and the preblend may be added through the upstream supply port 8 to form a premix. In embodiments, especially if the additive is a liquid, the additive can preferably be added to the extruder separately through the downstream supply port 9 or other location using a liquid metering device. The above examples do not preclude other methods of adding the partially crosslinked resin mixture, pigment, and additives to the extruder. After the toner resin, pigment, wax, and other additives have been fed into screw channel 7, the resin is melted and the pigment and additives disperse into the molten resin mixture as it is heated. The rotational speed of the extruder screw preferably ranges from about 50 to about 500 revolutions per minute. The toner additives added at the upstream supply port 8 are gradually dispersed into the resin. Additional toner additives may be added downstream at the supply port 9, if desired.

The dispersion of additives can be further promoted by using more kneading screw elements at downstream portion of the screws. Optimum temperature control can also facilitate the dispersion of additives. As the melt temperature is lowered, the melt viscosity will increase giving a higher shear stress. If needed, volatiles may be removed through downstream devolatilizer 10 by applying a vacuum. At the end of screw channel 7, the crosslinked resin with additives is pumped in molten form through die 13 such as, for example, a strand die to pelletizer 14 such as, for example, a water bath pelletizer, an underwater granulator, etc.

With further reference to FIGURE 1, the rotational speed of the screw 6 can be of any suitable value provided that the objectives of the present invention are achieved. Generally, the rotational speed of screw 6 is from about 50 revolutions per minute to about 500 revolutions per minute. The barrel temperature, which is controlled through thermocouple 12 and generated in part by heaters 11, is from about 40° C. to about 250° C. The die or head pressure generator 13 generates pressure from about 50 pounds per square inch to about 500 pounds per square inch. In embodiments, the screw is allowed to rotate at about 200 to about 250 revolutions per minute, the temperature along barrel 5 is maintained at about from about 40° C. to about 250° C., and preferably about 120° C. in the first three of eleven barrel sections, about 90° C. in the next seven barrel sections and 110° C. in the last barrel section, and the die pressure is about 50 pounds per square inch.

Thus, in process embodiments of the present invention, a partially crosslinked toner resin, a pigment, and optional toner additives are fed to a melt mixing apparatus and melt mixed to produce a pigmented toner composition. Thereafter the resulting toner composition is reextruded under high shear conditions, from 1 to about 10 times, at a second temperature which is the same or lower than the temperature range used in the first melt mixing step, to provide further reductions in macrogel particle size and macrogel content and to provide a low fix temperature toner composition with excellent offset performance, vinyl offset properties, and pigment dispersion properties. The linear resin component contained in the partially crosslinked toner resin mixture is a reactive polymer, preferably a linear reactive polymer such as, for example, linear unsaturated polyester. A preferred linear resin component has a degree of unsaturation of about 0.1 to about 30 mole percent, more preferably about 5 to about 25 mole percent.

In embodiments, the linear unsaturated polyester base resin is characterized by the number average molecular weight ($M_n$) as measured by gel permeation chromatography (GPC) in polystyrene equivalent units in the range typically from about 1,000 to about 20,000, and preferably from about 2,000 to about 5,000, and weight average molecular weight ($M_w$) in the range typically from about 2,000 to about 40,000, and preferably from about 4,000 to about 15,000.

The molecular weight distribution ($M_w/M_n$) is in the range typically from about 1.5 to about 6, and preferably from about 2 to about 4. The onset glass transition temperature ($T_g$) as measured by differential scanning calorimetry (DSC) is in the range typically from about 50° C. to about 70° C., and preferably from about 51° C. to about 65° C. Melt viscosity as measured with a mechanical rheometer at 10 radians per second is from about 5,000 to about 200,000 poise, and preferably from about 20,000 to about 100,000 poise at 100° C. and drops sharply with increasing temperature to from about 100 to about 5,000 poise, and preferably from about 400 to about 2,000 poise as temperature rises from 100° C. to 130° C.

In a preferred embodiment, the toner composition is comprised of a macrogel content of about 2 to about 10 weight percent.

Examples of useful linear resins are unsaturated polyesters which are low molecular weight condensation polymers which may be formed by the step wise reactions between both saturated and unsaturated diacids (or anhydrides) and dihydric alcohols (glycols or diols). The resulting unsaturated polyesters are reactive, crosslinkable, at (i) unsaturation sites (double bonds) along the polyester chain, and (ii) functional groups such as carboxyl, hydroxy, and the like, that is groups amenable to acid-base reactions. Typical unsaturated polyester base resins useful for this invention are prepared by melt polycondensation or other polymerization processes using diacids and/or anhydrides and diols. Suitable diacids and dianhydrides include but are not limited to saturated diacids and/or anhydrides such as, for example, succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like, and mixtures thereof; and unsaturated diacids and/or anhydrides such as, for example, maleic acid, fumaric acid, chloromaleic acid, methacrylic acid, acrylic acid, itaconic acid, citraconic acid, mesaconic acid, maleic anhydride, and the like, and mixtures thereof. Suitable diols include, but are not limited to, for example, propylene glycol, ethylene glycol, diethylene glycol, neopentyl glycol, dipropylene glycol, dibromoneopentyl glycol, propoxylated bisphenol-A, 2,2,4-trimethylpentane-1,3-diol, tetrabromo bisphenol dipropoxy ether, 1,4-butanediol, and the like, and mixtures thereof, soluble in good solvents such as, for example, tetrahydrofuran, toluene and the like.

Any suitably reactive and crosslinkable unsaturated polyester can be used to make the toner resins of the invention including unsaturated polyesters known for use in toner resins and including unsaturated polyesters whose properties previously made them undesirable or unsuitable for use as toner resins but which adverse properties are eliminated or reduced by partially crosslinked the resin as illustrated herein. The partially crosslinked thermoplastic resin mixture, prior to melt mixing or extrusion, is selected in amounts of from about 70 to about 98 weight percent of the total dispersed toner mixture.

Preferred unsaturated polyester base resins are prepared from diacids and/or anhydrides such as, for example, maleic anhydride, fumaric acid, and the like, and mixtures thereof; and diols such as, for example, propoxylated bisphenol A, propylene glycol, and the like and mixtures thereof. A particularly preferred polyester is poly(propoxylated bisphenol A fumarate).

A preferred partially crosslinked thermoplastic resin mixture can be produced in a melt mixing process disclosed in U.S. application Ser. No. 814,782, and includes for example, mixtures of crosslinked and uncrosslinked propoxylated bisphenol A fumarate polyester. The partially crosslinked thermoplastic resin used as the starting resin in the present invention prior to melt mixing with pigment or other additives comprises a mixture of crosslinked resin macrogel particles present in an amount of from about 0.001 to about 60 percent by weight, crosslinked resin microgel particles present in an amount of from about 0.001 to about 40 percent by weight, and uncrosslinked resin present in an amount of from about 99.999 to about 40 percent by weight.

The partially crosslinked toner resin mixture prior to melt mixing with pigments and additives has a combined weight fraction of macrogel and microgel content in the range of from about 0.001 to about 60 weight percent, preferably about 0.1 to about 40 weight percent. The linear portion of the resin, subsequent to melt mixing, preferably consists essentially of relatively low molecular weight resin which preferably does not crosslink during subsequent melt mixing operations, and is preferably an unsaturated polyester resin. The linear resin portion is in the range of from about 40 to about 99.999 percent by weight of said toner resin, and preferably in the range of from about 60 to about 99.9 percent by weight of the resulting pigmented toner composition following the repeated melt mixing or reextrusion steps.

The toners prepared by processes of the present invention can, in embodiments, provide a minimum fix temperature of from about 100° C. to about 200° C., preferably about 100° C. to about 160° C., more preferably about 110° C. to about 140° C., and a wide fusing latitude to minimize or prevent offset of the toner onto the fuser roll, and maintain high toner pulverization efficiencies. The low melt toner preferably has a fusing latitude greater than 10° C., preferably from about 10° C. to about 120° C., and more preferably more than about 20° C. and even more preferably more than about 30° C. Toners of the present invention evidenced minimized or substantially no vinyl offset, for example it has been shown by vinyl offset experiments that toner prepared from bisphenol A fumarate polyester has no vinyl offset, whereas toner prepared from styrene butyl methacrylate usually possesses considerable vinyl offset.

The gel content in resins and toners may be calculated by measuring the amount of linear, soluble resin utilizing the following extraction procedure: (1) the sample of the partially crosslinked resin or toner mixture to be analyzed, is weighed directly into a glass centrifuge tube; (2) toluene or another suitable solvent is added and the sample is gently shaken to dissolve, preferably overnight; (3) the sample is then centrifuged to remove any undissolved material, and an aliquot of the resulting supernatant is transferred to a preweighed aluminum dish; (4) the solvent is air evaporated, and then the sample is further dried in a convection oven to constant weight; and (5) the weight of the dried residue, multiplied by a volume normalization factor, gives the amount of the soluble resin portion. From this information, and the concentrations of pigment and other solid additives, if any, the insoluble portion or gel content of the resin or toner can be determined by difference.

Macrogel breakdown due to repeated melt mixing via rubber mill or extruder of resins or toners can be monitored by Gel Permeation Chromatography (GPC). The resin or toner sample can be dissolved, or partially dissolved, in an appropriate solvent and filtered. The chromatograms of the filtrate can show decreasing molecular weight of the high molecular weight portion or more accurately increasing amount of and decreasing particle size of the microgel, with subsequent reprocessing steps. The molecular weight of the low molecular weight linear portion of the resin remains essentially unchanged.

The resins are generally present in the toner of the present invention in an amount of from about 40 to about 98 percent by weight, and more preferably from about 70 to about 98 percent by weight, although they may be present in greater or lesser amounts. Additional additives, for example colorant, charge enhancing additives, release agents, surfactants, emulsifiers, pigment dispersants, flow additives, and the like, can be melt blended with the partially crosslinked resin mixture before, during, or after the repeated melt mixing steps at a second temperature that is less than or equal to the aforementioned first temperature used in the initial melt blending step, and at high shear as illustrated herein. The intermediate or final toner product can be pulverized by known methods such as milling in a fluid energy mill to form toner particles. The toner particles preferably have an average volume particle diameter of about 5 to about 25 microns and, more preferably about 5 to about 15 microns.

Various suitable colorants can be employed in toners of the invention, including suitable colored pigments, dyes, and mixtures thereof including carbon black, such as REGAL 330® carbon black (Cabot), acetylene black, lamp black, aniline black, chrome yellow, zinc yellow, sicofast yellow, luna yellow, NOVAPERM YELLOW™, Chrome Orange, Bayplast Orange, Cadmium Red, LITHOL SCARLET™, HOSTAPERM RED™, FANAL PINK™, HOSTAPERM PINK™, LITHOL RED™, RHODAMINE LAKE B™, Brilliant Carmine, HELIOGEN BLUE™, HOSTAPERM BLUE™, NEOPAN BLUE™, PV FAST BLUE™, Cinquassi Green, HOSTAPERM GREEN™, titanium dioxide, cobalt, nickel, iron powder, SICOPUR 4068 FF™, and iron oxides, such as MAPICO BLACK® (Columbian), NP608 and NP604 (Northern Pigment), BAYFERROX 8610™ (Bayer), MO8699™ (Mobay), TMB-100™ (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitably effective positive or negative charge enhancing additives can be selected for incorporation into the toner compositions of the present invention, preferably in an amount of about 0.1 to about 10, more preferably about 1 to about 3 percent by weight. Examples include quaternary ammonium compounds inclusive of alkyl pyridinium halides; alkyl pyridinium compounds, reference U.S. Pat. No. 4,298,672; organic sulfate and sulfonate compositions, U.S. Pat. No. 4,338,390; cetyl pyridinium tetrafluoroborates; distearyl dimethyl ammonium methyl sulfate; aluminum salts such as BONTRON E84® or E88® from Hodogaya Chemical; and the like compounds.

Also, there can be included in the toner or its surface release additives, such as waxes like low molecular weight waxes, such as with an $M_w$ of from about 1,000 to about 20,000, such as polyethylene, polypropylene and the like available from Sanyo Chemicals of Japan. Various effective amounts of wax can be selected, such as for example from about 0.1 to about 20, and preferably from about 1 to about 5 weight percent.

Additionally, other known internal and/or external additives may be added for charging, flow and lubrication of the toner in effective amounts such as, for example, from about 0.01 to about 5 weight percent, such as colloidal silica, zinc stearate, metal oxides, and the like.

The resulting toner particles optionally can be formulated into a developer composition by mixing with carrier particles. The toner particles range in size of from about 5 to about 12 microns in diameter and may be prepared by known pulverization, jetting, and classification means. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles, which are positively charged, will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, comprised of nodular carrier beads of nickel characterized by surfaces of reoccurring recesses and protrusions thereby providing particles with a relatively large external area. Other carriers are disclosed in U.S. Pat. Nos. 4,937,166 and 4,935,326.

The selected carrier particles can be used with or without a coating, the coating generally being comprised of fluoropolymers, such as polyvinylidene fluoride resins, terpolymers of styrene, methyl methacrylate, a silane, such as triethoxy silane, tetrafluoroethylenes, other known coatings, and the like.

The diameter of the carrier particles is generally from about 50 microns to about 1,000 microns, and preferably about 100 to about 200 microns, thus allowing these particles to possess sufficient density and inertia to avoid adherence to the electrostatic images during the development process. The carrier particles can be mixed with the toner particles in various suitable combination, such as about 1 part carrier to about 10 parts to about 200 parts by weight of toner.

Toners of the invention can be used in known electrostatographic imaging methods, although the fusing energy requirements of some of those methods can be reduced in view of the advantageous fusing properties of the toner of the invention as discussed herein. Thus, for example, the toners or developers of the invention can be charged triboelectrically and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 160° C., more preferably lower than 140° C., and more preferably about 110° C.

The invention will further be illustrated in the following nonlimiting Examples, it being understood that these Examples are intended to be illustrative only and that the invention is not intended to be limited to the materials, conditions, process parameters and the like recited herein. Parts and percentages are by weight unless otherwise indicated.

EXAMPLE I

Xerographic toner compositions are prepared according to the procedure as follows.

Partially Crosslinked Toner Resin Preparation (N=0) A partially crosslinked unsaturated polyester resin was prepared by the reactive extrusion process by melt mixing 98.4 parts of linear unsaturated propoxylated bisphenol A fumarate polyester resin having $M_n$ of about 4,000, $M_w$ of about 10,300, $M_w/M_n$ of about 2.58 as measured by GPC against polystyrene standards, onset $T_g$ of about 55° C. as measured by DSC, and melt viscosity of about 29,000 poise at 100° C. and about 750 poise at 130° C. as measured at 10 radians per second, and 1.6 percent by weight benzoyl peroxide initiator as outlined in the following procedure.

The unsaturated polyester resin and benzoyl peroxide initiator are blended in a rotary tumble blender at 22 revolutions per minute for 30 minutes. The resulting dry mixture is then fed at about 200 pounds per hour using a loss-in-weight feeder into the upstream supply port located at the first barrel section of a Werner & Pfleiderer twin screw extruder, Model ZSK-40 super compounder, which has a screw diameter of 40 millimeters and a length-to-diameter ratio of 52.5 with the following process conditions: barrel temperature profile of 40°/40°/200°/200°/200°/200°/200°/200°/200°/150°/150° C. and screw speed of about 200 revolutions per minute. The crosslinked resin in the extruder, upon exiting from sheet die, is cooled and solidified in a double belt cooler and subsequently hammer milled in a Fitz mill equipped with revolving knives. The melt index properties and the analyzed macrogel content of the resin (N=0) are summarized in Table 1 and are compared to the resin component of the toner (N>0) obtained in subsequent melt mixing and reextrusion processing steps.

Toner Preparation (N=1) A first xerographic toner mixture was prepared by melt mixing in an extruder 94 parts of the partially crosslinked thermoplastic resin mixture (N=0) as described above with 6 parts carbon black by feeding the preblend into a ZSK-40 extruder with a temperature profile of 120°/120°/120°/90°/90°/90°/90°/90°/90°/90°/110° C., at a rate of 200 pounds per hour and screw speed of 230 revolutions per minute. After pulverizing and classification, a toner with a volume average size of about 11 microns and a geometric standard deviation of about 1.3 is obtained. The melt index properties, and macrogel content of the resin component of the toner (N=1) are summarized in Table 1.

Second Pass Reextrusion Toner (N=2) A second pass toner was prepared by feeding the N=1 toner described above into a ZSK-40 extruder with a temperature profile of 120°/120°/120°/90°/90°/90°/90°/90°/90°/90°/110° C., at a rate of 200 pounds per hour and screw speed of 230 revolutions per minute to provide the pigmented resin mixture (N=2). The melt index properties, and macrogel content of the resin component of the toner mixture (N=2) are summarized in Table 1.

Third through Fourth Pass Reextrusion (N=3 to 4) The second pass toner (N=2) was then sequentially reextruded in accordance with the second pass conditions up to about a total of four times to repeatedly and exhaustively breakdown large or macrogel particles to microgel. Small samples from each reextrusion run were evaluated for melt index, gel content, and GPC characterization. The macrogel content, melt index data, and the GPC data suggest that the repeated (for N=1 to 4) melt mixing or reextrusion processing of the toner results in a progressive decrease in the average macrogel particle size or dissociation of the macrogel particles into microgel particles. Therefore, more microgel passes through the filter prior to GPC analysis for each successive reextrusion, and more and smaller gel particles are detected.

After a total of three to four passes (N=3 to 4), no additional macrogel breakdown of dissociation was apparent. The melt index properties, and macrogel content of the resin component of the toner (N=3 to 4) are summarized in Table 1. The macrogel content in weight percent of the total resin as measured by the aforementioned gravimetric extraction procedure is tabulated in the column labeled Macrogel Content. Copy quality observations made by an individual skilled in copy quality evaluation of xerographically developed and fused images are represented in the column labeled CQ by symbols as follows: Excellent(+); Poor(Δ); and Not Analyzed (N/A).

The N=1 toner provides unacceptable or poor copy quality results, especially at low toner mass per unit area development areas. The toner comprised of the N=1 extrudate material upon xerographic development resulted in image ghosting, and which ghosting is believed to be attributable to the adherent and sticky consistency of the macrogel material contained in the resin mixture. Additionally, the macrogel phase contains large unpigmented gel particles which are particularly prone to remaining on the photoreceptor and cause filming of the photoreceptor surface. The unpigmented macrogel particles residing in pigmented toner compositions are believed to be responsible for producing a print image defect known as mottle or spots and or streaks which defects possess considerable color variation in a printed image. The aforementioned problem is particularly apparent at low toner mass per unit area (TMA) deposition regions for the aforementioned N=1 toner material.

The macrogel particles also are believed to be responsible for causing toner transfer deletions. The copy quality defects are particularly evident for low toner mass per unit area (TMA). Typical TMA values are generally about 3 to 6 mg/cm$^2$ and 3.5 to 4.5 mg/cm$^2$, while low TMA values are less than or equal to about 3 mg/cm$^2$.

The toners comprised of the aforementioned N=2 to 4 extrudate materials, upon xerographic development, eliminated the aforementioned poor development and copy quality defects observed for the N=1 toner material.

EXAMPLE II

Xerographic toner compositions were prepared by both extrusion and Banbury/rubber mill processing methods using the macrogel breakdown procedure as described in Example I. The toners were analyzed by the aforementioned gravimetric extraction and GPC procedures for differences in macrogel content and the extent of macrogel breakdown relative to the initial partially crosslinked resin extrudate (N=0). The toners were wax free and comprised of 94 weight percent of a partially crosslinked unsaturated propoxylated bisphenol A fumarate polyester described in Example I and 6 weight percent carbon black. The starting partially crosslinked resin (N=0) had a total macrogel content of about 35.2 weight percent and the resin portion of the toner (N=1) resulting from extrusion processing had a macrogel content of about 14.3 weight percent while the

TABLE 1

| SAMPLE | Melt Index (117° C., 2.16 kg g/10 min) | Melt Index (117° C., 16.6 kg g/10 min) | Macrogel Content (weight percent) | CQ |
| --- | --- | --- | --- | --- |
| Linear resin | 48.9 | 523.6 | 2.1 | N/A |
| Partially crosslinked resin (N = 0) | No Flow | 7.3 | 35.2 | N/A |

TABLE 1-continued

| SAMPLE | Melt Index (117° C., 2.16 kg g/10 min) | Melt Index (117° C., 16.6 kg g/10 min) | Macrogel Content (weight percent) | CQ |
|---|---|---|---|---|
| Toner, 1st pass (N = 1) | 2.1 | 43.4 | 13.4 | Δ |
| 2nd pass (N = 2) | 3.8 | 58.7 | 6.3 | + |
| 3rd pass (N = 3) | 4.8 | 63.8 | 4.4 | + |
| 4th pass (N = 4) | 5.7 | 80.6 | 3.9 | + |

Banbury toner had slightly less macrogel content of about 12.0 weight percent. Subsequent repeated melt mixing steps indicated a progressive decrease in macrogel content was occurring as observed in Example I. The macrogel content of toners processed with a Banbury/rubber mill appears to be broken down slightly more efficiently compared to extruded toners.

When the above described procedure is separately repeated in either a Banbury/rubber mill or an extruder for a second toner containing additionally 4 weight percent of a polyethylene wax (POLYWAX 1000), essentially the same results as were observed in the aforementioned wax-free toners. The result suggests that the toners made with Banbury rubber mill processing equipment experienced greater macrogel breakdown as indicated by smaller gel particles as indicated by GPC. The greater macrogel breakdown observed in the toners processed using Banbury rubber mill equipment is also evident from the aforementioned superior print and copy quality observed in developed xerographic images made using flexible layered photoconductor, such as disclosed in U.S. Pat. No. 4,265,990.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A process for the preparation of pigmented toner compositions comprising:
   a) forming at a first temperature, a first melt mixture comprised of a partially crosslinked thermoplastic resin, pigment, and a wax, wherein the partially crosslinked thermoplastic resin is comprised of a mixture of crosslinked resin macrogel particles, crosslinked resin microgel particles, and uncrosslinked resin; and
   b) melt mixing under high shear conditions at a second temperature, the first melt mixture to form a second mixture, wherein the macrogel particles are partially converted into microgel particles wherein said melt mixing at said second temperature is repeated N times to provide an N+1 product wherein N is an integer from 1 to about 10 and wherein the repeated melt mixing is conducted in an extruder and the extruder screw configuration contains about 6 to about 12 additional kneading blocks situated downstream from the port used to introduce said first mixture; and
   c) providing water injection into the extruder at a downstream location to achieve a second temperature which is lower than the first temperature and a higher shear stress condition with respect to the melt mixture thereby providing enhanced mixing, pigment dispersion, and macrogel particle breakdown.

2. A process in accordance with claim 1 wherein the pigmented toner has an onset glass transition temperature of from about 50° C. to about 70° C. and a melt viscosity, at 10 radians per second, from about 5,000 to about 250,000 poise at about 100° C. and from about 10 to about 25,000 poise at about 160° C.

3. A process in accordance with claim 1 wherein the uncrosslinked resin is an unsaturated propoxylated bisphenol A fumarate polyester.

4. A process in accordance with claim 1 wherein the partially crosslinked thermoplastic resin comprises a mixture of crosslinked resin macrogel particles present in an amount of from about 0.001 to about 60 percent by weight, crosslinked resin microgel particles present in an amount of from about 0.001 to about 40 percent by weight, and uncrosslinked resin present in an amount of from about 99.999 to about 40 percent by weight prior to melt mixing.

5. A process in accordance with claim 1 wherein uniform pigment dispersion is achieved.

6. A process in accordance with claim 1 wherein from 1 to about 3 waxes are selected.

7. A process in accordance with claim 1 wherein the N+1 product has a macrogel particle content of from about 0.001 to about 30 percent by weight, microgel particle content of from about 0.001 to about 30 percent by weight and an uncrosslinked resin content of from about 99.999 to about 40 percent by weight.

8. A process in accordance with claim 1 wherein the pigmented toner comprises from about 4 to about 15 weight percent of carbon black pigment, from about 2 to about 8 weight percent of a wax component, and from about 77 to about 94 weight percent of a partially crosslinked resin component comprising macrogel and microgel crosslinked resin particles, and uncrosslinked resin.

9. A process in accordance with claim 1 wherein the optional additives are selected from the group consisting of alkyl pyridinium halides, organic sulfates, organic bisulfates, organic sulfonates, distearyl dimethyl ammonium methyl sulfate, distearyl dimethyl ammonium bisulfate, cetyl pyridinium lakes, charge controlling pigments and dyes, polyvinyl pyridine, treated carbon blacks, tetraphenyl borate salts, phosphonium salts, nigrosine, metal-salicylate salts, polystyrene-polyethyleneoxide block copolymer salt complexes, poly(dimethyl amino methyl methacrylate), organo-aluminum salts, hydrophobically surface treated submicron silica particles, fluorinated surfactants, zinc stearate, and mixtures thereof.

10. A process in accordance with claim 1 wherein the macrogel resin particles in the second mixture are thermally and mechanically dissociable aggregates of microgel particles.

11. A process in accordance with claim 1 wherein said macrogel resin particles are present in an amount of from 0.1 to about 30 percent by weight of said partially crosslinked thermoplastic resin.

12. A process in accordance with claim 1 wherein said macrogel resin particles in the second mixture are from about 0.1 to about 3.0 microns in average volume diameter and are substantially uniformly distributed in said toner.

13. A process in accordance with claim 1 wherein an extruder is selected and the extruder barrel temperature is from about 40° C. to about 250° C., and the rotational speed of the extruder screw ranges from about 50 to about 500 revolutions per minute.

14. A process in accordance with claim 1 wherein macrogel and microgel particles have from about 0.2 to about 1.0 crosslinks between crosslinked polymer chains.

15. A process in accordance with claim 1 wherein the uncrosslinked resin comprises a linear unsaturated polyester resin.

16. A process in accordance with claim 1 wherein the linear unsaturated polyester resin has a degree of unsaturation from about 0.1 to about 30 mole percent.

17. A process in accordance with claim 1 wherein the uncrosslinked resin has a number average molecular weight ($M_n$) as measured by gel permeation chromatography in the range of from about 1,000 to about 20,000.

18. A process in accordance with claim 1 wherein the uncrosslinked resin has a weight average molecular weight ($M_w$) in the range from about 2,000 to about 40,000.

19. A process in accordance with claim 1 wherein the uncrosslinked resin has a molecular weight distribution ($M_w/M_n$) from about 1.5 to about 6.

20. A process in accordance with claim 1 wherein the uncrosslinked resin has an onset glass transition temperature ($T_g$) as measured by differential scanning calorimetry in the range from about 50° C. to about 70° C.

21. A process in accordance with claim 1 wherein the uncrosslinked resin has a melt viscosity as measured with a mechanical viscometer at 10 radians per second from about 5,000 to about 200,000 poise at about 100° C., and said melt viscosity drops sharply with increasing temperature to from about 100 to about 5,000 poise as the temperature rises from 100° C. to 130° C.

22. A process in accordance with claim 1 wherein the pigmented toner has a minimum fix temperature of below about 180° C.

23. A process in accordance with claim 1 wherein the pigmented toner has a minimum fix temperature from about 100° C. to about 160° C.

24. A process in accordance with claim 1 wherein the pigmented toner has a fusing latitude greater than about 10° C.

25. A process in accordance with claim 1 wherein the pigmented toner has a fusing latitude from about 10° to about 100° C.

26. A process in accordance with claim 1 wherein the pigmented toner has a fusing latitude of from about 30° C. to about 70° C.

27. A process in accordance with claim 1 wherein the pigmented toner contains linear uncrosslinked resin, microgel resin particles, and macrogel resin particles which particles are both insoluble in organic solvents, and wherein said microgel particles are less than about 0.1 micron in diameter and are substantially uniformly distributed in said resin.

* * * * *